United States Patent
Jeon et al.

(10) Patent No.: US 12,351,070 B2
(45) Date of Patent: Jul. 8, 2025

(54) METHOD FOR BALANCING PARALLEL BATTERY PACKS USING PRE-CHARGING CIRCUIT AND APPARATUS AND SYSTEM FOR THE SAME

(71) Applicants: Hyundai Motor Company, Seoul (KR); Kia Corporation, Seoul (KR)

(72) Inventors: Yoon Cheol Jeon, Suwon-Si (KR); Hyun Ki Cho, Anyang-Si (KR); Jin Soo Jang, Yongin-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 51 days.

(21) Appl. No.: 18/200,209

(22) Filed: May 22, 2023

(65) Prior Publication Data

US 2024/0198854 A1  Jun. 20, 2024

(30) Foreign Application Priority Data

Dec. 16, 2022 (KR) ......... 10-2022-0177527

(51) Int. Cl.
*B60L 58/22* (2019.01)
*B60L 53/20* (2019.01)
(Continued)

(52) U.S. Cl.
CPC ......... *B60L 58/22* (2019.02); *B60L 53/20* (2019.02); *B60L 58/12* (2019.02); *B64D 27/24* (2013.01);
(Continued)

(58) Field of Classification Search
CPC ......... B60L 58/22; B60L 53/20; B60L 58/12; B60L 2200/10; B60L 2240/547; B64D 27/24; B64D 2221/00; B64D 27/34; B64D 27/357; B64U 50/34; B64U 50/30; H02J 7/0048; H02J 2207/20; H02J 2310/40;
(Continued)

(56) References Cited

U.S. PATENT DOCUMENTS 8,193,773 B2   6/2012   Vasselin et al.
8,933,667 B2   1/2015   Park et al.
(Continued)

FOREIGN PATENT DOCUMENTS

CN   110785909 A   2/2020
CN   115117974 A   9/2022
(Continued)

OTHER PUBLICATIONS

Jun. 4, 2024—(EP) Extended European Search Report—App No. 23208543.1.

*Primary Examiner* — Rexford N Barnie
*Assistant Examiner* — Thai H Tran
(74) *Attorney, Agent, or Firm* — Banner & Witcoff, Ltd.

(57) ABSTRACT

Provided is a method in an electricity-driven apparatus to be driven by receiving power through a plurality of battery packs in a parallel type. The method includes detecting a state of charge (SOC) of each of the plurality of battery packs, calculating a voltage difference between the plurality of battery packs based on the detected SOC, and performing battery pack balancing based on the calculated voltage difference exceeding a threshold value. The battery pack balancing is performed by a pre-charging circuit including a balancing relay.

20 Claims, 11 Drawing Sheets

(51) Int. Cl.
*B60L 58/12* (2019.01)
*B64D 27/24* (2024.01)
*B64U 50/34* (2023.01)
*H02J 7/00* (2006.01)

(52) U.S. Cl.
CPC ............ *B64U 50/34* (2023.01); *H02J 7/0048* (2020.01); *B60L 2200/10* (2013.01); *B64D 2221/00* (2013.01); *H02J 2207/20* (2020.01)

(58) Field of Classification Search
CPC ...... H02J 7/0016; H02J 7/0019; H02J 7/0029; H01M 10/4207; H01M 2010/4271; H02M 1/008; H02M 1/36; B64C 39/024; G01R 19/16542; G01R 31/3835; H02P 27/06; B60Y 2200/51; B60Y 2200/91; Y02T 10/70; Y02T 10/7072; Y02T 10/72; Y02T 50/60
See application file for complete search history.

(56) References Cited

U.S. PATENT DOCUMENTS

| | | |
|---|---|---|
| 11,262,409 B2 | 3/2022 | Hong et al. |
| 2009/0189568 A1 | 7/2009 | Vasselin et al. |
| 2012/0268070 A1* | 10/2012 | Park .................... H01M 10/441 |
| | | 320/126 |
| 2014/0062409 A1* | 3/2014 | Endo ................... H02J 7/00308 |
| | | 320/126 |
| 2014/0306666 A1* | 10/2014 | Choi ..................... H02J 7/0016 |
| | | 320/134 |
| 2015/0253389 A1* | 9/2015 | Arai .................. G01R 31/3828 |
| | | 324/427 |
| 2017/0133722 A1* | 5/2017 | Kim ..................... H01M 10/441 |
| 2019/0198945 A1* | 6/2019 | Machida ............... H02J 7/0016 |
| 2020/0021119 A1 | 1/2020 | Kim |
| 2020/0386821 A1 | 12/2020 | Hong et al. |
| 2021/0082480 A1 | 3/2021 | Sung et al. |
| 2021/0273462 A1 | 9/2021 | Zhang et al. |
| 2021/0391731 A1 | 12/2021 | Kirleis et al. |
| 2022/0013814 A1 | 1/2022 | Kirleis et al. |
| 2022/0115878 A1 | 4/2022 | Khozikov et al. |
| 2022/0311269 A1* | 9/2022 | Ishihara ................. H02J 7/345 |
| 2022/0376519 A1 | 11/2022 | Lee |

FOREIGN PATENT DOCUMENTS

| | | |
|---|---|---|
| JP | 2009183139 A | 8/2009 |
| JP | 2022-63228 A | 4/2022 |
| KR | 101882286 B1 | 7/2018 |
| KR | 102217590 B1 | 2/2021 |
| KR | 102244141 B1 | 4/2021 |
| KR | 102284872 B1 | 7/2021 |
| WO | 2012/128445 A1 | 9/2012 |

\* cited by examiner

METHOD FOR BALANCING PARALLEL BATTERY PACKS USING PRE-CHARGING CIRCUIT AND APPARATUS AND SYSTEM FOR THE SAME

CROSS-REFERENCE TO RELATED APPLICATION

This application claims the benefit of priority to Korean Patent Application No. 10-2022-0177527, filed in the Korean Intellectual Property Office on Dec. 16, 2022, the entire contents of which are incorporated herein by reference.

TECHNICAL FIELD

The present disclosure relates to battery pack balancing, and more particularly, relates to a technology of balancing battery packs connected to each other in parallel by using a pre-charging circuit.

BACKGROUND

In general, a battery pack is provided in the form of a module by stacking several cells (single cells) of battery. Accordingly, cell balancing among the multiple battery cells is significantly important.

The cell balancing is important because the cells may have different charging speeds due to the unbalance between cells resulting in a possible overcharge of an individual cell (s). The voltage of an overcharged cell may exceed the voltage limit (e.g., end-of-charge voltage).

The cell having the cell voltage exceeding the end-of charge voltage may get damaged or may have the risk of explosion.

To alleviate this risk, a cell balancing circuit connected to a battery management system (BMS) is necessarily applied to the battery pack, such that the cell balancing is implemented in charging.

SUMMARY

The present disclosure has been made to solve the above-mentioned problems occurring in the prior art while advantages achieved by the prior art are maintained intact.

An aspect of the present disclosure provides a method for balancing a parallel battery pack using a pre-charging circuit, and an apparatus and a system therefor.

According to the present disclosure, a method may include: detecting a state of charge (SOC) of each of a plurality of battery packs that provide power to an electricity-driven apparatus, wherein the plurality of battery packs are connected in parallel; calculating, based on the detected SOC, a voltage difference between the plurality of battery packs; and performing, by one or more pre-charging circuits including a balancing relay, battery pack balancing, based on the calculated voltage difference exceeding a threshold value.

Each of the one or more pre-charging circuits corresponds to one of the plurality of battery packs. Each pre-charging circuit of the one or more pre-charging circuits may include: a pre-charging relay connected to a resistor in series. Performing of the battery pack balancing may include dropping, by at least one pre-charging circuit of the one or more pre-charging circuits, to drop a voltage of a corresponding battery pack by joule heating of the resistor.

Performing of the battery pack balancing may include: identifying, based on the detected SOC, a battery pack, of the plurality of battery packs, that has a maximum voltage; and dropping a voltage of the battery pack having the maximum voltage by turning on, for a specific time, a pre-charging relay and the balancing relay of a pre-charging circuit of the one or more pre-charging circuits. The pre-charging circuit may correspond to the battery pack having the maximum voltage.

Performing of the battery pack balancing may further include: turning off the pre-charging relay and the balancing relay after the specific time has elapsed; re-measuring a voltage of each battery pack of the plurality of battery packs; and recalculating the voltage difference based on the re-measured voltages.

The method may further include sequentially repeating the battery pack balancing based on the re-measured voltages, until the re-calculated voltage difference reaches a threshold value.

The method may further include performing a pre-charging operation of charging a capacitor, of an inverter connected to a motor of the electricity-driven apparatus, by turning on a pre-charging relay of the one or more pre-charging circuits, based on the calculated voltage difference being less than or equal to a threshold value.

The one or more pre-charging circuits may include a main relay and a pre-charging relay. The method may further include supplying power to an inverter, connected to a motor of the electricity-driven apparatus, by turning off the pre-charging relay and turning on the main relay, based on a capacitor of the inverter being fully charged.

Calculating of the voltage difference between the plurality of battery packs may include: identifying, among the plurality of battery packs, a first battery pack that has a maximum voltage of the plurality of battery packs; and identifying, among the plurality of battery packs, a second battery pack that has a minimum voltage of the plurality of battery packs. The voltage difference may be calculated as a difference between the maximum voltage and the minimum voltage.

A pre-charging circuit, of the one or more pre-charging circuits, may be connected to the plurality of battery packs.

The electricity-driven apparatus may include at least one of an electric vehicle or an unmanned aerial vehicle.

According to the present disclosure, an electricity-driven apparatus may include: a plurality of battery packs connected to each other in parallel; a plurality of inverters connected to motors driven by power provided by the plurality of battery packs; one or more pre-charging circuits including a balancing relay and interposed between the plurality of battery packs and the plurality of inverters; and a battery management system configured to control the one or more pre-charging circuits to perform battery pack balancing. The battery management system may be further configured to control the balancing relay to perform the battery pack balancing.

Each of the one or more pre-charging circuits may correspond to a respective one of the plurality of battery packs. The one or more pre-charging circuits may include a pre-charging relay connected to a resistor in series. The one or more pre-charging circuits may be configured to drop a voltage of a battery pack of the plurality of battery packs by joule heating of the resistor.

The battery management system may be further configured to: detect a state of charge (SOC) of each of the plurality of battery packs; calculate a voltage difference between the plurality of battery packs based on the detected SOC; and perform the battery pack balancing based on the calculated voltage difference exceeding a threshold value.

The battery management system may be further configured to: identify, based on a state of charge (SOC) of each of the plurality of battery packs, a battery pack, of the plurality of battery packs, that has a maximum voltage; and drop a voltage of the battery pack having the maximum voltage by turning on, for a specific time, a pre-charging relay and the balancing relay of a pre-charging circuit of the one or more pre-charging circuits. The pre-charging circuit may correspond to the battery pack having the maximum voltage.

The battery management system may be further configured to: turn off the pre-charging relay and the balancing relay after the specific time has elapsed; and measure a voltage of each battery pack of the plurality of battery packs; and calculate, based on the measured voltages, a voltage difference between the plurality of battery packs.

The battery management system may be further configured to sequentially repeat the battery pack balancing based on the measured voltages, until the calculated voltage difference reaches a threshold value.

The battery management system may be further configured to perform a pre-charging operation of charging capacitors, of the plurality of inverters, by turning on a pre-charging relay of the one or more pre-charging circuits, based on a voltage difference between the plurality of battery packs being less than or equal to a threshold value.

The one or more pre-charging circuits may include: a main relay; and a pre-charging relay. The battery management system may be further configured to, based on capacitors of the plurality of inverters being fully charged, supply power to the plurality of inverters by turning off the pre-charging relay and turning on the main relay.

The battery management system may be configured to calculate the voltage difference based on a maximum voltage and a minimum voltage of the plurality of battery packs.

A pre-charging circuit, of the one or more pre-charging circuits, may be connected to the plurality of battery packs.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
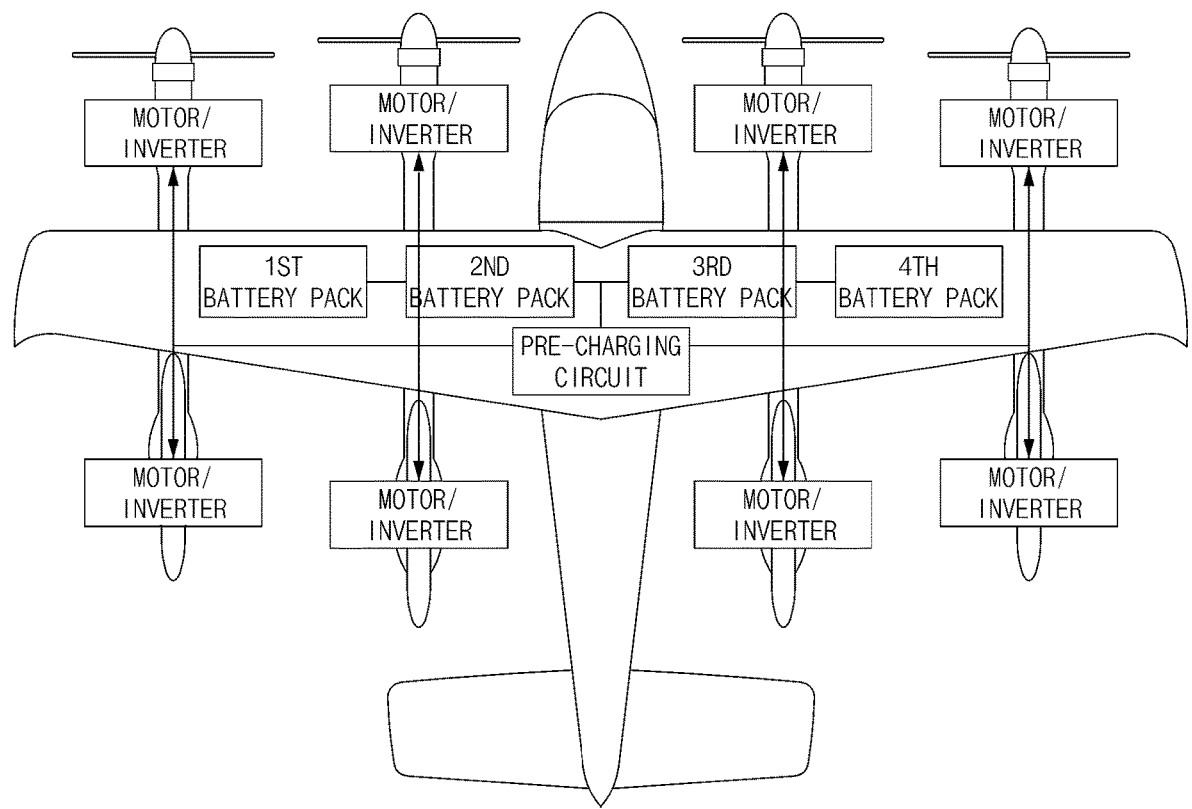
FIG. 1 is a view illustrating the whole system structure of an electricity-driven fuselage.

Hereinafter, some embodiments of the present disclosure will be described in detail with reference to the exemplary drawings. In adding the reference numerals to the components of each drawing, it should be noted that the identical or equivalent component is designated by the identical numeral even if they are displayed on other drawings. Further, in describing the embodiment of the present disclosure, a detailed description of well-known features or functions will be ruled out in order not to unnecessarily obscure the gist of the present disclosure.

In addition, in the following description of components, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In general, a cell balancing circuit senses the voltage of each cell and bypasses the energy, which is supplied after the full charging of the cell, to a resistor, such that the energy is consumed in the form of heat.

Therefore, if the battery pack is charged with power, the cell balancing circuit senses whether the cell is fully charged. If the full charging of the cell is determined, the supplied charging energy may be controlled such that the voltage of the cell is not increased beyond the end-of-charged.

In general, a plurality of battery packs are provided in an electricity-powered moving object while being mounted through in serial connection or in parallel connection. If the battery packs are connected to each other in parallel, and if different voltage states are present between the battery packs, an electrical spark may occur. If the voltage difference is significantly high between the battery packs, it may start a fire. In particular, if a lithium ion battery is applied, the lithium ion battery has higher energy as compared with some other types of batteries. Accordingly, if battery packs having mutually different voltage levels are connected to each other in parallel, components, such as a motor or an inverter, connected to the battery pack may be damaged.

To solve the problem discussed above, the state of charge (SOC) of each of battery packs connected to each other in parallel may be measured. The battery pack having the smallest SOC may be charged with power such that the SOC of the battery pack is matched to be equal to the highest SOC.

However, according to the above technology, an additional charging device may be provided in an urban air mobility (UAM) or an electric vehicle mounted with a parallel battery pack. Accordingly, the user has to connect the charging cable to the UAM or the electric vehicle every the device is to be started, which may negatively impact the user experience.

Hereinafter, embodiments of the present disclosure will be described with reference to FIGS. 1 to 11.

FIG. 1 is a view illustrating the whole system structure of an electricity-driven fuselage.

Referring to FIG. 1, the electricity-driven fuselage may supply power necessary to drive a plurality of motors and/or inverters, as a plurality of battery packs are connected to each other in parallel.

As illustrated in FIG. 1, if power charged in battery packs connected to each other in parallel is used as a power source for a plurality of motors/inverters, an initial inverter voltage is 0 V. Since the charged battery pack has a constant voltage, a pre-charging circuit may be provided to supply main power, if a battery pack voltage approximates an inverter voltage by charging the voltage of a capacitor provided at an inverter side to prevent surging. For example, a capacitor may be at least one of various components included in a circuit constituting an inverter. For example, the inverter may be a separate component that is connected (e.g., electrically connected) to the motor and physically separated from the motor.

If a voltage difference in a specific level or more is made between the battery packs connected to each other in parallel, a spark may be caused, seriously, smoke or a flare may be caused in various relays and/or switches used for the parallel-connection between the battery packs. Accordingly, a constant voltage difference needs to be made between battery packs to safely supply the power to the motor and/or the inverter as the battery packs are connected to each other in parallel.

In the present suggestion, the following description will be made regarding a method for balancing a battery pack using a pre-charging circuit and a device and a system for the same, capable of ensuring safe starting and safe power supplying by performing voltage balancing between the battery packs, as well as the pre-charging of an inverter capacitor, by using the pre-charging circuit to supply battery power to the motor and/or the inverter.

FIG. 1 illustrates that the method for balancing a battery pack using a pre-charging circuit is applied to an electricity-driven fuselage for the illustrative purpose. For example, the method may be identically or similarly applied to an electric vehicle and another moving object driven by electricity.

Figure 2:
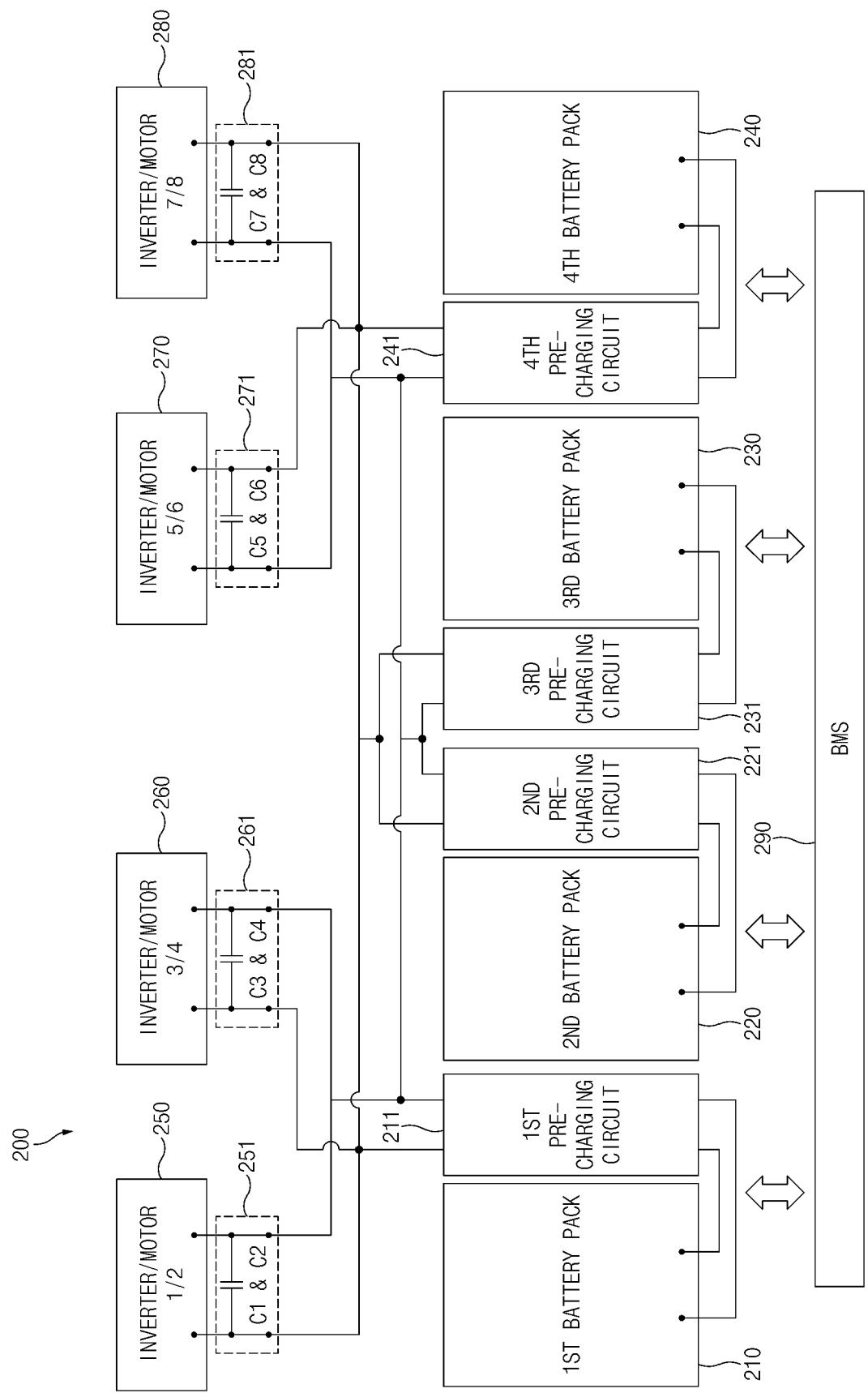
FIG. 2 is a view illustrating a system for balancing a parallel battery pack using a pre-charging circuit.

FIG. 2 is a view illustrating a system for balancing a parallel battery pack using a pre-charging circuit.

Referring to FIG. 2, a system 200 for balancing the battery pack may include first to fourth battery packs 210, 220, 230, and 240, first to fourth pre-charging circuits 211, 221, 231, and 241 connected to the first to fourth battery packs 210, 220, 230, and 240, respectively, first to eighth inverters/motors 250, 260, 270, and 280 driven by receiving power charged in the first to fourth battery packs 210, 220, 230, and 240 through the first to fourth pre-charging circuits 211, 221, 231, and 241, first to eighth capacitors 251, 261, 271, and 281 interposed between the first to eighth inverters/motors 250, 260, 270, and 280, and the first to fourth pre-charging circuits 211, 221, 231, and 241 and charged with power for driving the respective inverters, and a battery management system 290 to monitor the state of each battery pack and control the relevant pre-charging circuit to perform voltage balancing between the battery packs connected to each other in parallel.

Although the description made with reference to FIG. 2, regarding driving eighth motors/inverts by connecting four battery packs in parallel, the number of the battery packs connected to each other in parallel and the number of inverts/motors to receive power from the plurality of battery packs may be varied, depending on the design of those skilled in the art, and the usage and the structure of a relevant moving object.

The detailed structure of the pre-charging circuit and an operation of controlling the pre-charging circuit for battery pack balancing in the battery management system 290 will be described in more detail with reference to accompanying drawings.

Figure 3:
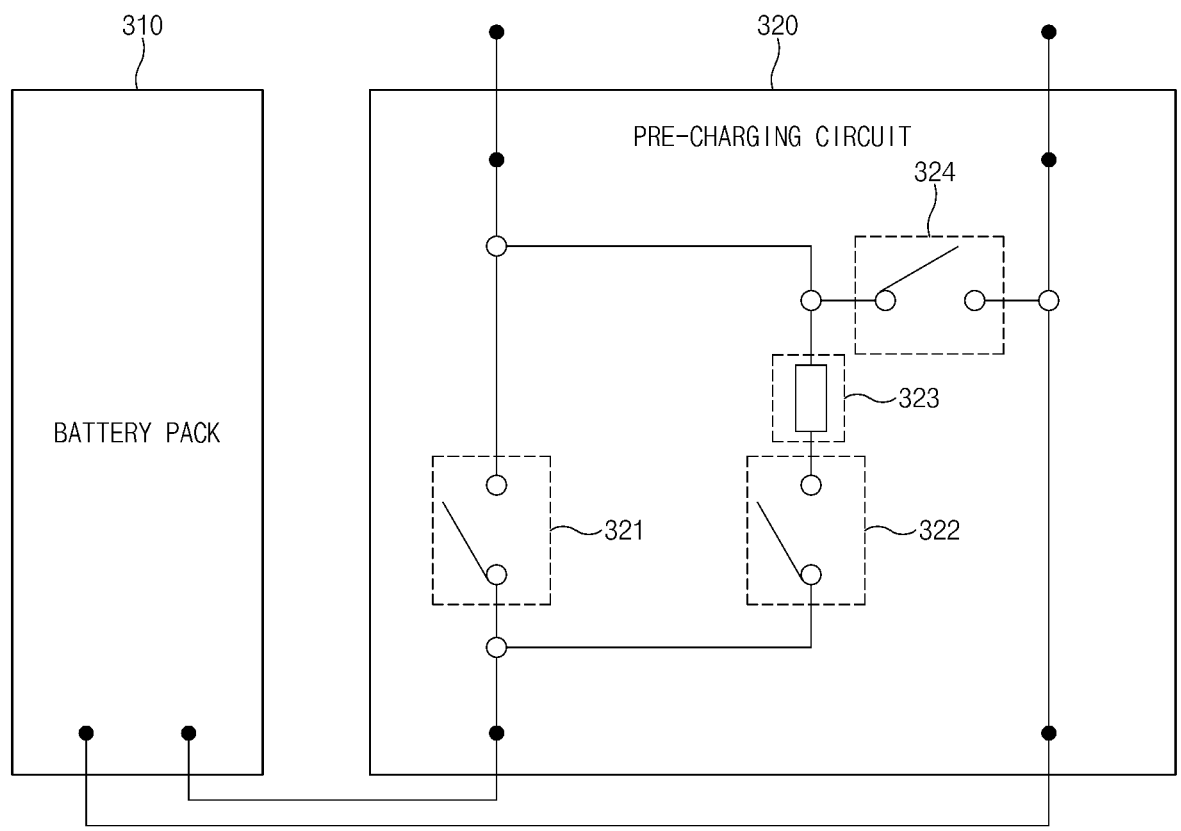
FIG. 3 is a view illustrating the structure of a pre-charging circuit.

FIG. 3 is a view illustrating the structure of a pre-charging circuit.

Referring to FIG. 3, the pre-charging circuit 320 may include a main relay 321, a pre-charging relay 322, a resistor 323, and a balancing relay 324.

The main relay 321 is a relay switch for supplying main power to an inverter/motor.

The pre-charging relay 322 is a relay switch to charge a capacitor, which is provided at a front stage of an inverter/motor, to be at a voltage level similar to a voltage level of the battery pack.

The balancing relay 324 is a relay switch to drop the voltage level of a relevant battery pack to lower the voltage difference between the battery packs to a specific level or less.

Hereinafter, the detailed procedure for controlling the pre-charging circuit by the battery management system 290 to perform the battery pack balancing will be described with reference to FIG. 3 and FIGS. 5 to 8.

FIGS. 5 to 8 are views illustrating a procedure for balancing the battery packs connected to each other in parallel using a pre-charging circuit.

Figure 5:
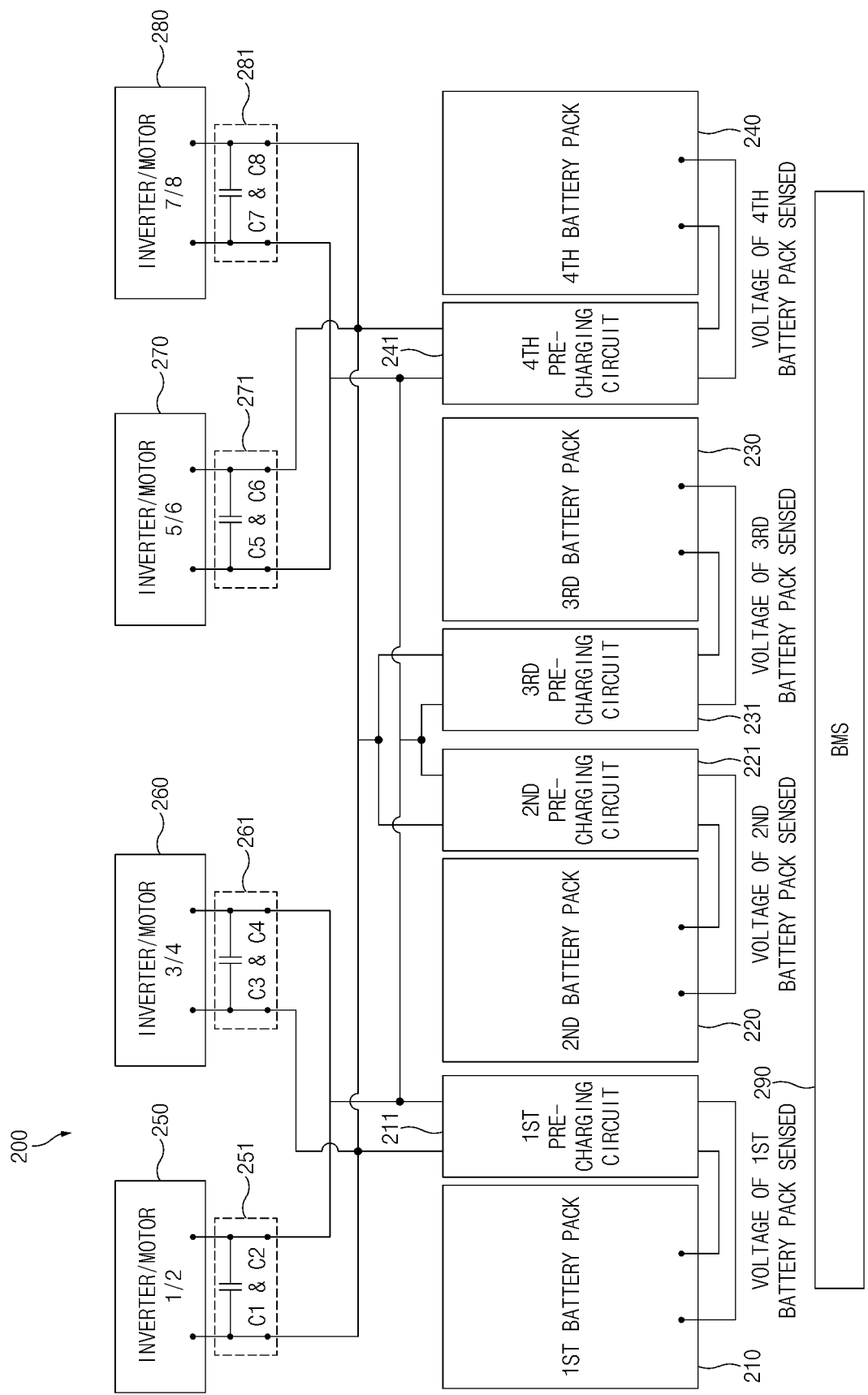
FIGS. 5 to 8 are views illustrating a procedure for balancing the battery packs connected to each other in parallel using a pre-charging circuit.

The battery management system 290 may measure the voltage of each battery pack using a provided voltage sensor, as illustrated in FIG. 5.

The battery management system 290 may determine that battery pack balancing is required, if a voltage difference between battery packs exceeds a specific critical voltage.

The battery management system 290 may control the pre-charging circuit 320 to drop the voltage of the battery pack having the maximum voltage.

Figure 6:
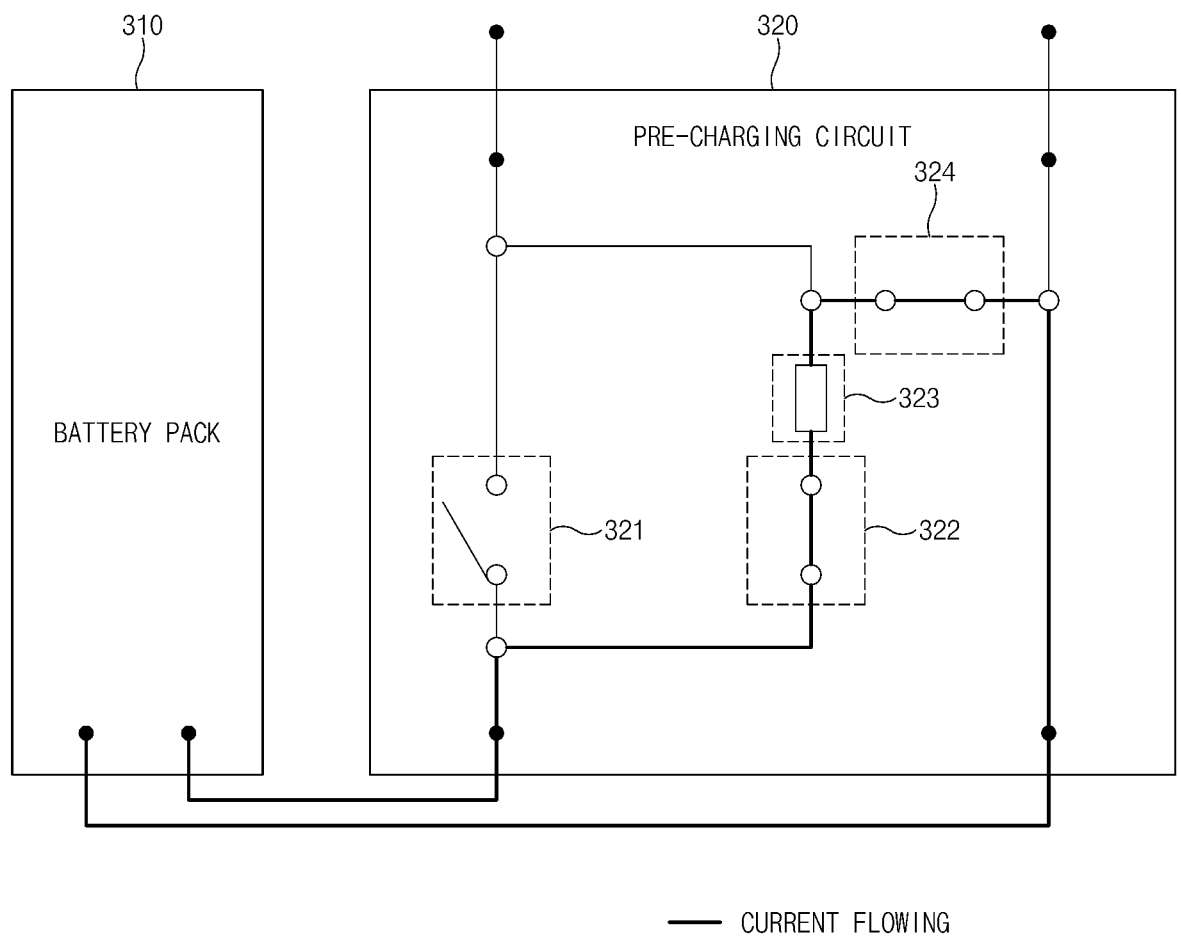

As illustrated in FIG. 6, the battery management system 290 may turn on the pre-charging relay 322 and the balancing relay 324 in the state that the main relay 321 is turned off to drop the voltage of the battery pack 310. In this case, Joule heating occurs due to a resistor 323. Accordingly, the charging power of the battery pack 310 may be reduced, such that an output voltage of the battery pack 310 is dropped.

Figure 7:
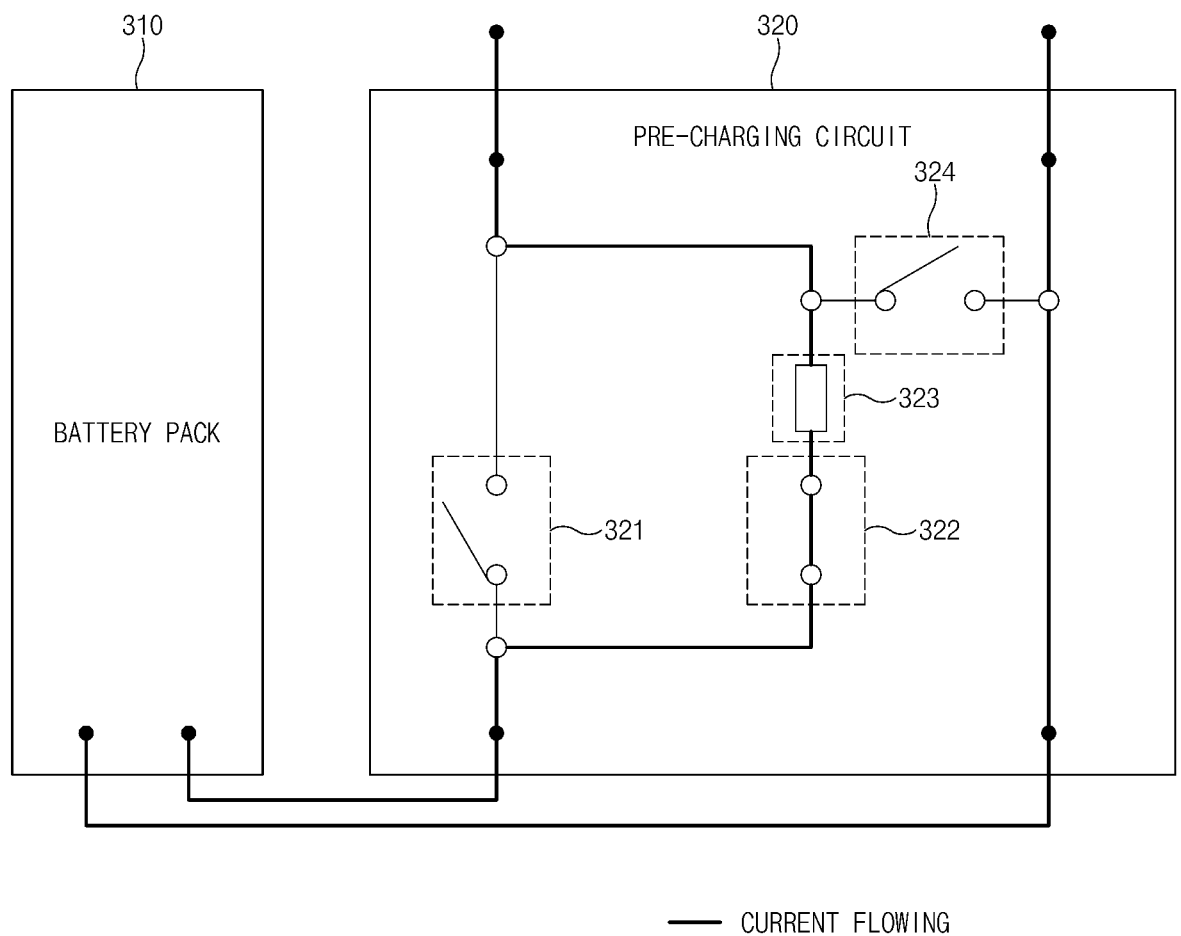

If the battery management system 290 determines the voltage difference between the battery packs as being dropped to a specific critical value (e.g., a threshold value) or less, by monitoring the voltage drop of the battery pack 310, the battery management system 290 may control the capacitor of the inverter/motor to be charged by turning on the pre-charging relay 322 in the state that the main relay 321 and the balancing relay 324 are turned off, as illustrated in FIG. 7.

Figure 8:
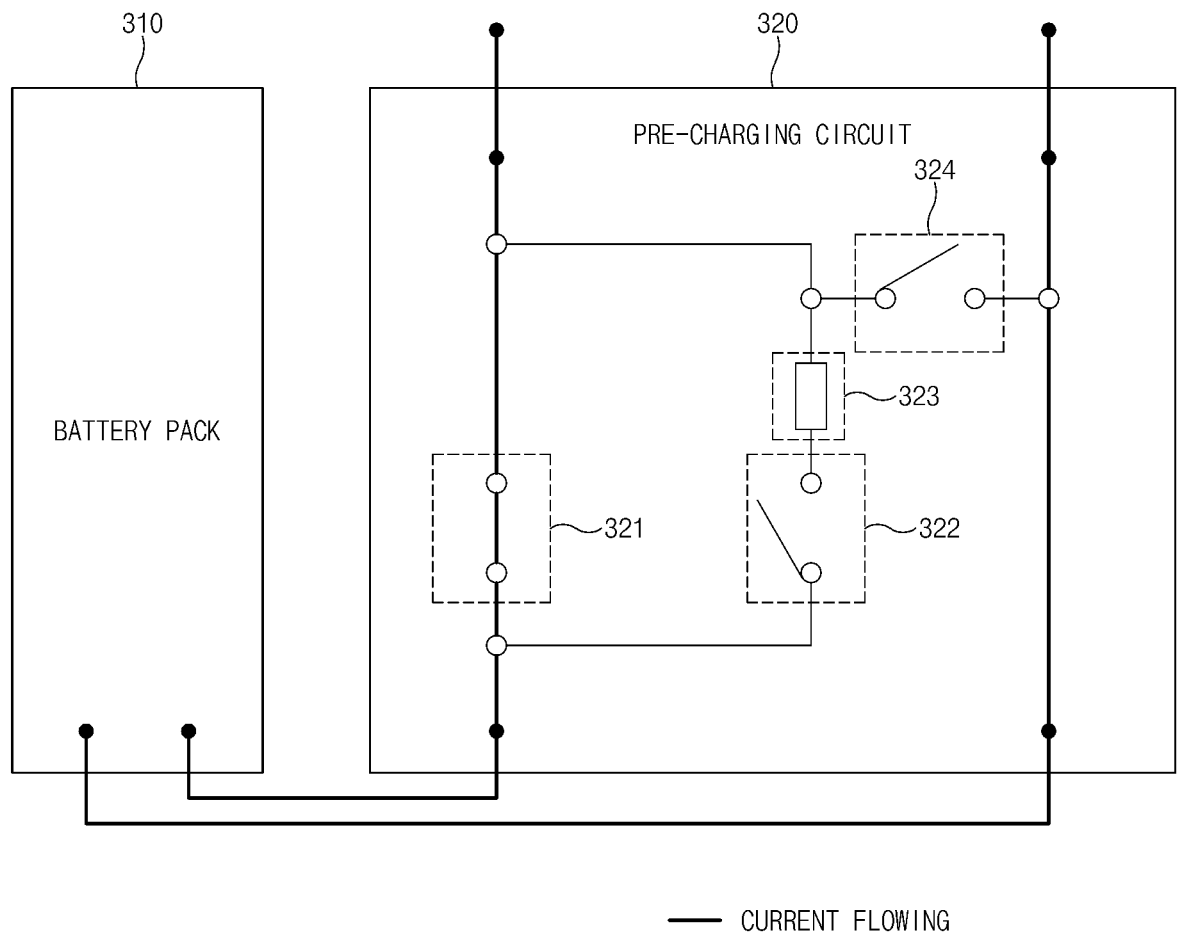

If the charging of the capacitor of the motor/inverter is completed, the battery management system 290 may control supplying main power to the inverter/motor by turning on the main relay 321, in the state that the pre-charging relay 322 and the balancing relay 324 are turned off, as illustrated in FIG. 8.

Figure 4:
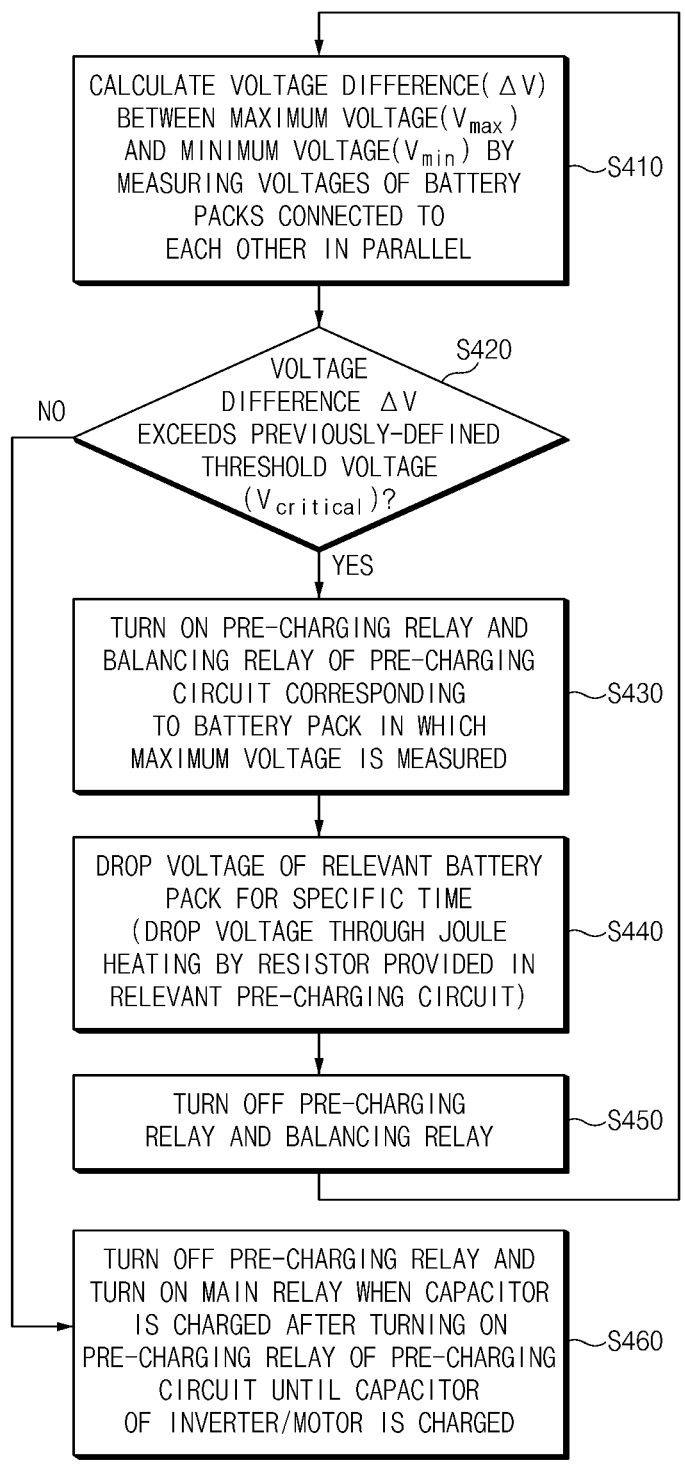
FIG. 4 is a flowchart illustrating a method for balancing battery packs connected to each other in parallel by using a pre-charging circuit.

FIG. 4 is a flowchart illustrating a method for balancing battery packs connected to each other in parallel by using a pre-charging circuit.

Referring to FIG. 4, the battery pack management system 290 may calculate the voltage difference ($\Delta V$) between the maximum voltage ($V_{max}$) and the minimum voltage ($V_{min}$) by measuring the voltages of the battery packs connected to each other in parallel (S410).

The battery management system 290 may determine whether the voltage difference $\Delta V$ between the battery packs exceeds a critical voltage ($V_{critical}$) which is previously defined (S420).

Accordingly of the determination, if the voltage difference $\Delta V$ exceeds the critical voltage ($V_{critical}$), the battery management system 290 may turn on the pre-charging relay and the balancing relay of the pre-charging circuit corresponding to the battery pack in which the maximum voltage is measured (S430). In this case, it should be noted that the main relay is turned off.

The battery management system 290 may drop the voltage of the relevant battery pack by maintaining the pre-charging relay and the balancing relay to be turned on for a specific time (S440). In this case, the voltage of the battery pack may be dropped through Joule heating by the resistor provided in the relevant pre-charging circuit.

The battery management system 290 may turn off the pre-charging relay and the balancing relay after the voltage drops for a specific time (S450) and return to step 410 described above to calculate the voltage difference between the battery packs again.

If the voltage difference between the battery packs is equal to or less than the specific critical or less in S420, the battery management system 290 turns on the pre-charging relay of the pre-charging circuit until the capacitor of the inverter/motor is charged to be in a specific level. If the capacitor is charged with power to be in the specific level or more, the battery management system 290 turns off the pre-charging relay and turns on the main relay such that the main power is supplied to the inverter/motor (S460)

The battery management system 290 may perform a battery pack balancing operation on the second highest voltage battery pack in the same manner as in FIG. 4 if a voltage difference between the battery packs is not dropped to be the critical voltage or less even though the voltage of the battery pack, in which the maximum voltage ($V_{max}$) is measured, is dropped.

The battery management system 290 may sequentially perform a battery pack balancing operation on the remaining battery packs until a voltage difference between the battery packs reaches a critical voltage or less, which is a target voltage.

Figure 9:
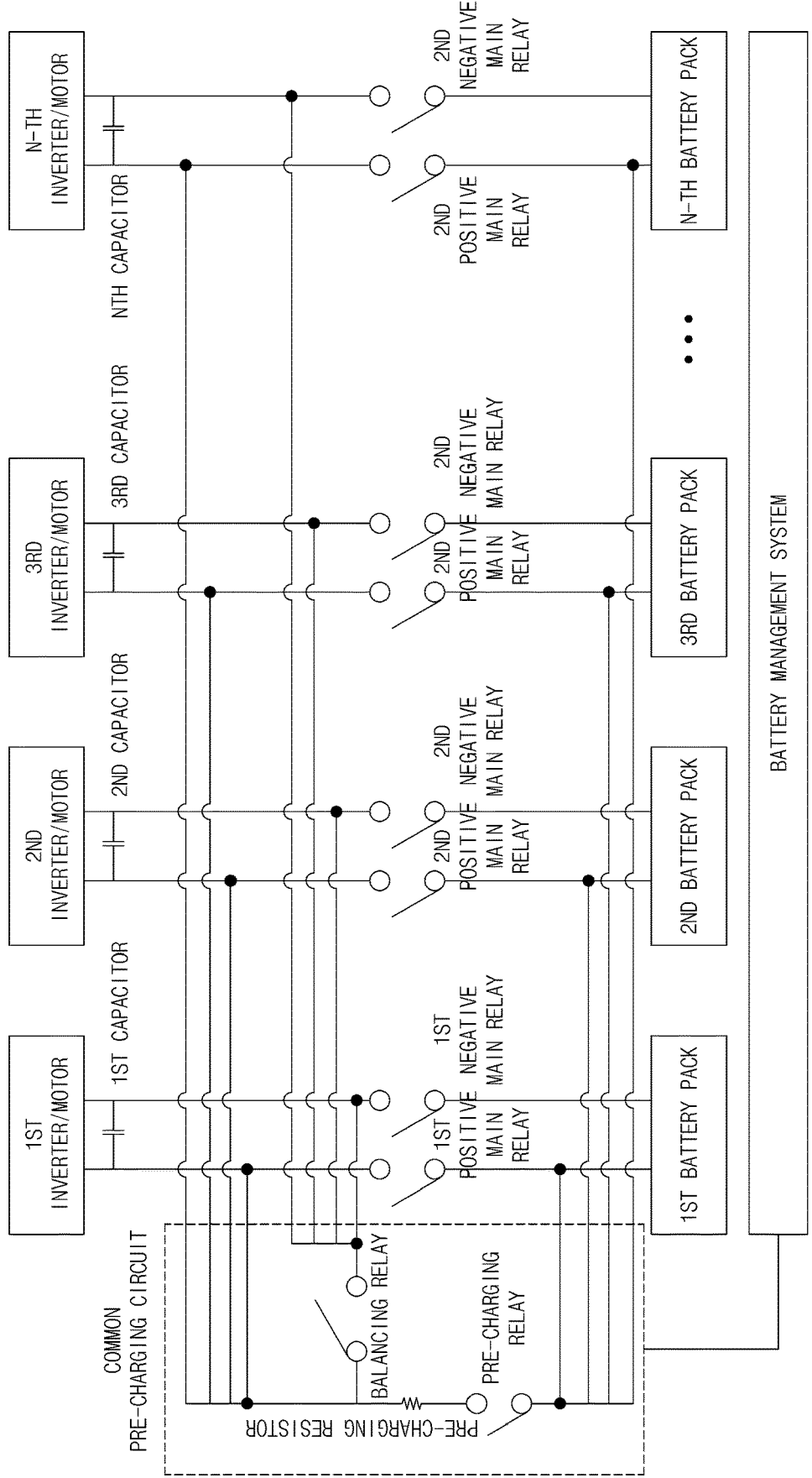
FIG. 9 illustrates a system structure for performing battery pack balancing using a common pre-charging circuit.

FIG. 9 illustrates a system structure for performing battery pack balancing using a common pre-charging circuit.

The battery pack balancing and the inverter/motor pre-charging are used only to connect a battery to an inverter at the initial state of a moving object. Accordingly, the battery pack balancing and the inverter/motor pre-charging are not used during flying (or operating). Accordingly, the weight of the moving object may need to be minimized.

To this end, the common pre-charging circuit may be applied for all battery packs connected to each other in instead of an individual pre-charging parallel in common, circuit for each battery pack, as described above with reference to FIGS. 1 to 8, Although the principle of balancing the battery packs connected to each other in parallel and the principle of inverter/motor pre-charging are the same as the operating principle of the pre-charging circuit of FIGS. 1 to 8, the number of the pre-charging the resistor, and the balancing relay may be reduced in proportion to the number of the system illustrated in FIG. 9. Accordingly, the weight of the moving object may be reduced.

Referring to FIG. 9, according to the characteristic of the suggested system circuit, a plus (+) terminal and a minus (−) terminal of each battery pack are connected to a positive main relay and a negative main relay, and the relay circuit for pre-charging and balancing are, in common, applied to all battery packs.

The battery management system may first measure a voltage of battery packs connected to each other in parallel, and compare the difference between the maximum voltage and the minimum voltage with an allowance value previously defined. If the voltage difference between battery packs is greater than the allowance value, the pre-charging relay, the balancing relay, and the relevant main relay of the common pre-charging circuit are controlled to be turned on, thereby performing the balancing operation for the relevant battery pack.

The battery management system may sequentially perform balancing operations for the remaining battery packs until the voltage difference between the battery packs reaches the critical voltage, which is the target value.

After the balancing of the battery pack is completed, the battery management system may perform the pre-charging operation of charging the capacitor of the inverter/motor by controlling turning off the balancing relay and turning on the pre-charging relay and the negative main relay.

After the pre-charging operation is completed, the battery management system may control turning off the pre-charging relay and turning on the positive main relay and the negative main relay of the battery pack, such that the main power is supplied to the inverter/motor.

Figure 10:
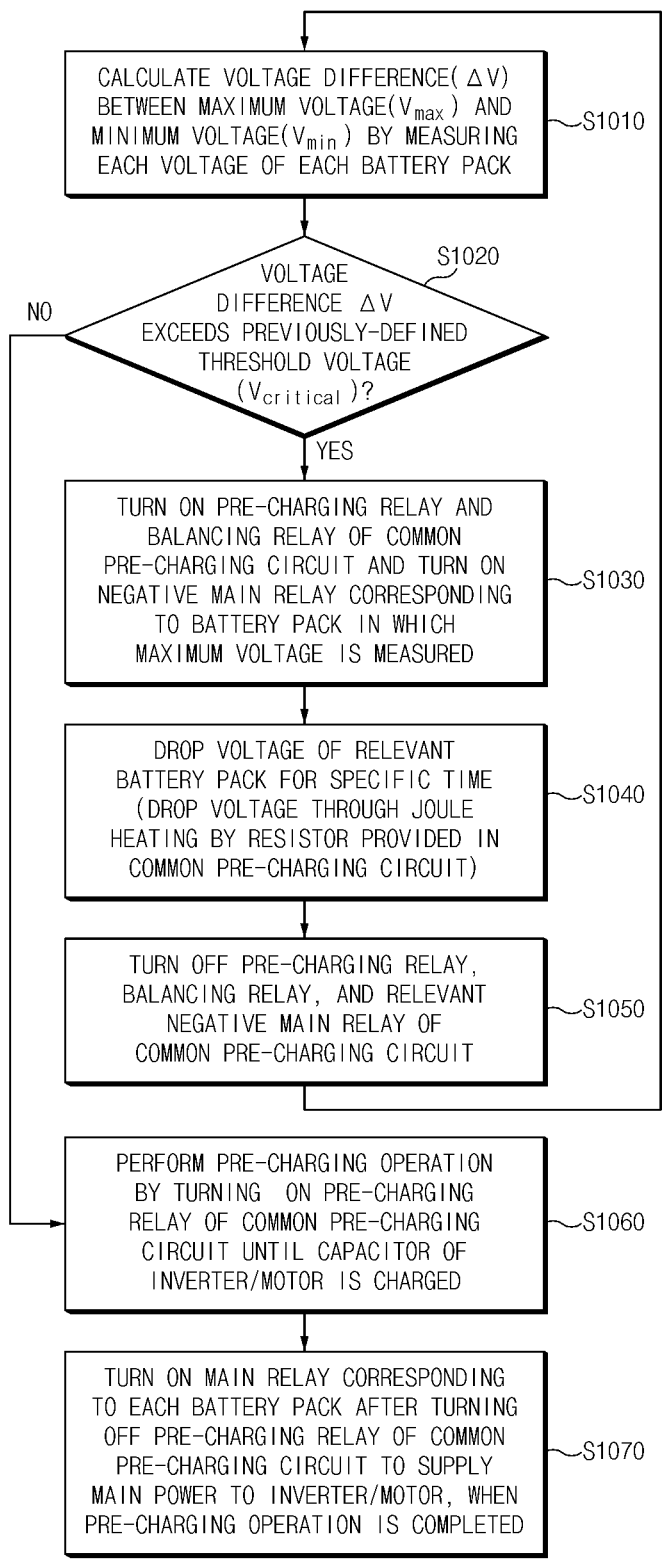
FIG. 10 is a flowchart illustrating a method for balancing battery packs connected in parallel using the common pre-charging circuit.

FIG. 10 is a flowchart illustrating a method for balancing battery packs connected in parallel using the common pre-charging circuit.

Referring to FIG. 10, the battery pack management system 290 may calculate the voltage difference ($\Delta V$) between the maximum voltage ($V_{max}$) and the minimum voltage ($V_{min}$) by measuring the voltages of the battery packs connected to each other in parallel (S1010).

The battery management system 290 may determine whether the voltage difference $\Delta V$ between the battery packs exceeds a specific critical voltage ($V_{critical}$) (S1020).

Accordingly of the determination, if the voltage difference $\Delta V$ exceeds the critical voltage ($V_{critical}$), the battery management system 290 may turn on the pre-charging relay and the balancing relay of the common pre-charging circuit and may turn on the negative main relay of the battery pack in which the maximum voltage is measured (S1030).

The battery management system 290 may drop the voltage of the relevant battery pack by maintaining the pre-charging relay and the balancing relay to be turned on for a specific time (S1040). In this case, the voltage of the battery pack may be dropped through Joule heating by the resistor provided in the relevant pre-charging circuit.

The battery management system 290 may turn off the pre-charging relay, the balancing relay, and the relevant negative main relay of the common pre-charging circuit after the voltage drops for a specific time (S1050) and return to step 1010 described above to calculate the voltage difference between the battery packs again.

The battery management system 290 may repeatedly perform step 1010 to step 1050 until the voltage difference between the battery packs is the threshold value or less which is previously defined, thereby performing the battery pack balancing operation.

If the voltage difference between the battery packs is equal to or less than the threshold value or less, which is previously defined, in S1020, the battery management system 290 may control turning on the pre-charging relay of the common pre-charging circuit and the negative main relay of each battery pack in the state that the balancing relay of the common pre-charging circuit is turned off, until the capacitor of the inverter/motor is charged to a specific level, thereby performing the pre-charging operation of charging the capacitor of the inverter/motor with power.

After the pre-charging operation is completed, the system 290 may control turning on the battery management positive main relay and the negative main relay of each battery pack after turning off the pre-charging relay of the common pre-charging circuit to supply main power to the inverter/motor (S1070).

Figure 11:
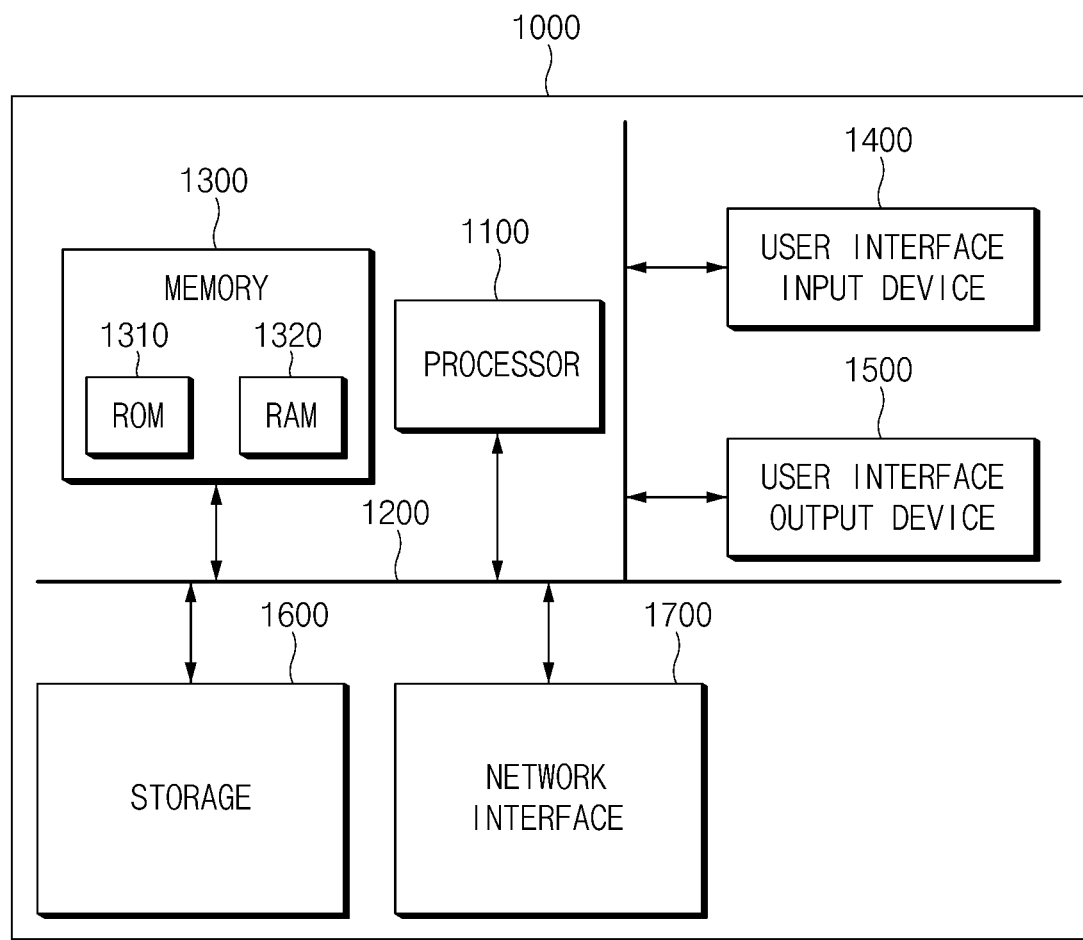
FIG. 11 illustrates a computing system.

FIG. 11 illustrates a computing system.

A computing system 1000 may be applied to a battery management system of FIGS. 1 to 10.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The computing system 1000 may access an external server, such as a big data server or a cloud server, of a vehicle through the network interface 1700 to acquire various pieces of information necessary for battery pack balancing using the pre-charging circuit and may retain the acquired information to the memory 1300.

For example, the computing system 1000 may acquire, from the external server, information on a threshold value for a voltage difference between the battery packs, which is a parameter for determining whether to perform the battery pack balancing. The minimum battery pack voltage value and/or the maximum battery pack voltage value required for the driving of an electric vehicle may be varied depending on the driving and the driving pattern of the driver. For example, a driving pattern of a driver enjoying higher-speed driving and a higher acceleration and a driving pattern of a driver enjoying lower-speed driving and a lower acceleration may be different from each other in terms of the required level of an output voltage of a battery pack, and thus may be different from each other in terms of a time point for starting the battery pack balancing and a critical voltage value related to a battery pack voltage difference for determining whether to start the battery pack balancing.

In addition, the charging/discharging capacity and the maximum output voltage of the battery pack may be varied depending on the remaining lifespan of the battery pack and the temperature of the battery pack. Accordingly, the time point for starting the battery pack balancing and the starting condition of the battery pack balancing may be differently defined.

The big data server may predict and manage the maximum output voltage and the remaining lifespan of the battery pack mounted for each vehicle periodically or in real time, based on various pieces of data collected from the electric vehicle. The computing system 1000 may, from the big data server, information on the optimal control parameter, for example, the threshold value of the voltage difference between the battery packs, which corresponds to the remaining lifespan. If the optimal control parameter of a relevant vehicle is changed or updated, the big data server may control to perform the optimal battery pack balancing by transmitting relevant information to the computing system 1000.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (e.g., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to the present disclosure, there may be provided a method for balancing a parallel battery pack using a pre-charging circuit, and an apparatus and a system for the same.

An aspect of the present disclosure is to provide a method for balancing a parallel battery pack using a pre-charging circuit, capable of effectively balancing a battery pack connected in parallel without a separate charging unit to balance a battery pack by providing a balancing relay to a pre-charging circuit as well as a pre-charging relay, and a vehicle control device for the same, and a system including the same.

An aspect of the present disclosure is to provide a method for balancing a parallel battery pack using a pre-charging circuit, capable of providing a common pre-charging circuit applied to all battery packs connected to each other in parallel in common, thereby reducing vehicle manufacturing costs and weight, a vehicle control device for the same, and a system including the same.

Besides, a variety of effects directly or indirectly understood through the disclosure may be provided.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method comprising:
   detecting a state of charge (SOC) of each of a plurality of battery packs that provide power to an electricity-driven apparatus, wherein the plurality of battery packs are connected in parallel;

calculating, based on the detected SOC, a voltage difference between the plurality of battery packs; and performing, by one or more pre-charging circuits, battery pack balancing, based on the calculated voltage difference exceeding a threshold value, wherein each of the one or more pre-charging circuits corresponds to one of the plurality of battery packs, wherein each pre-charging circuit of the one or more pre-charging circuits comprises:

a pre-charging relay and a resistor that are connected in series with each other between a first electrode of a battery pack and a capacitor of an inverter connected to a motor of the electricity-driven apparatus;

a main relay connected in parallel to the pre-charging relay and the resistor; and a balancing relay connected between the resistor and a second electrode of the battery pack.

2. The method of claim 1, wherein the performing of the battery pack balancing comprises forming a closed-loop connecting the first electrode of the battery pack, the pre-charging relay, the resistor, and the second electrode of the battery pack.

3. The method of claim 1, wherein the performing of the battery pack balancing comprises:

identifying, based on the detected SOC, a battery pack, of the plurality of battery packs, that has a maximum voltage; and dropping a voltage of the battery pack having the maximum voltage by turning on, for a specific time, the pre-charging relay and the balancing relay of a first pre-charging circuit of the one or more pre-charging circuits, wherein the first pre-charging circuit of the one or more precharging circuits corresponds to the battery pack having the maximum voltage.

4. The method of claim 3, wherein the performing of the battery pack balancing further comprises:

turning off the pre-charging relay and the balancing relay of the first pre-charging circuit of the one or more pre-charging circuits after the specific time has elapsed;

re-measuring a voltage of each battery pack of the plurality of battery packs; and recalculating the voltage difference based on the re-measured voltages.

5. The method of claim 4, further comprising sequentially repeating the battery pack balancing based on the re-measured voltages, until the re-calculated voltage difference reaches a threshold value.

6. The method of claim 1, further comprising performing a precharging operation of charging the capacitor by turning on the pre-charging relay of at least one pre-charging circuit of the one or more pre-charging circuits, based on the calculated voltage difference being less than or equal to a threshold value.

7. The method of claim 1, further comprising supplying power to the inverter by turning off the pre-charging relay and turning on the main relay, based on the capacitor of the inverter being fully charged.

8. The method of claim 1, wherein the calculating of the voltage difference between the plurality of battery packs comprises:

identifying, among the plurality of battery packs, a first battery pack that has a maximum voltage of the plurality of battery packs; and identifying, among the plurality of battery packs, a second battery pack that has a minimum voltage of the plurality of battery packs, wherein the voltage difference is calculated as a difference between the maximum voltage and the minimum voltage.

9. The method of claim 1, wherein a first pre-charging circuit, of the one or more pre-charging circuits, is connected to at least two battery packs of the plurality of battery packs via other pre-charging circuits of the one or more pre-charging circuits.

10. The method of claim 1, wherein the electricity-driven apparatus comprises at least one of an electric vehicle or an unmanned aerial vehicle.

11. An electricity-driven apparatus comprising:

a plurality of battery packs connected to each other in parallel;

a plurality of inverters connected to motors driven by power provided by the plurality of battery packs; and one or more pre-charging circuits interposed between the plurality of battery packs and the plurality of inverters, wherein each of the one or more pre-charging circuits corresponds to one of the plurality of battery packs, wherein each pre-charging circuit of the one or more pre-charging circuits comprises:

a pre-charging relay and a resistor that are connected in series with each other between a first electrode of a battery pack and a capacitor of an inverter connected to a motor of the electricity-driven apparatus;

a main relay connected in parallel to the pre-charging relay and the resistor; and a balancing relay connected between the resistor and a second electrode of the battery pack.

12. The electricity-driven apparatus of claim 11, wherein each pre-charging circuit of the one or more pre-charging circuits is configured to form a closed-loop connecting the first electrode of the battery pack, the pre-charging relay, the resistor, and the second electrode of the battery pack.

13. The electricity-driven apparatus of claim 12, further comprising a battery management system, wherein the battery management system is configured to:

detect a state of charge (SOC) of each of the plurality of battery packs;

calculate a voltage difference between the plurality of battery packs based on the detected SOC; and perform battery pack balancing of the plurality of battery packs based on the calculated voltage difference exceeding a threshold value.

14. The electricity-driven apparatus of claim 13, wherein the battery management system is configured to calculate the voltage difference based on a maximum voltage and a minimum voltage of the plurality of battery packs.

15. The electricity-driven apparatus of claim 11, further comprising a battery management system, wherein the battery management system is configured to:

identify, based on a state of charge (SOC) of each of the plurality of battery packs, a battery pack, of the plurality of battery packs, that has a maximum voltage; and drop a voltage of the battery pack having the maximum voltage by turning on, for a specific time, the pre-charging relay and the balancing relay of a first pre-charging circuit of the one or more pre-charging circuits, wherein the first pre-charging circuit of the one or more pre-charging circuits corresponds to the battery pack having the maximum voltage.

16. The electricity-driven apparatus of claim 15, wherein the battery management system is further configured to:
- turn off the pre-charging relay and the balancing relay of the first pre-charging circuit of the one or more pre-charging circuits after the specific time has elapsed; and
- measure a voltage of each battery pack of the plurality of battery packs; and
- calculate, based on the measured voltages, a voltage difference between the plurality of battery packs.

17. The electricity-driven apparatus of claim 16, wherein the battery management system is further configured to sequentially repeat the battery pack balancing based on the measured voltages, until the calculated voltage difference reaches a threshold value.

18. The electricity-driven apparatus of claim 11, further comprising a battery management system, wherein the battery management system is configured to perform a pre-charging operation of charging capacitors, of the plurality of inverters, by turning on the pre-charging relay of at least one pre-charging circuit of the one or more pre-charging circuits, based on a voltage difference between the plurality of battery packs being less than or equal to a threshold value.

19. The electricity-driven apparatus of claim 11, further comprising a battery management system, wherein the battery management system is configured to, based on capacitors of the plurality of inverters being fully charged, supply power to the plurality of inverters by turning off the pre-charging relay and turning on the main relay.

20. The electricity-driven apparatus of claim 11, wherein the main relay is connected between the first electrode of the battery pack and the capacitor.

* * * * *